United States Patent
Ray et al.

(10) Patent No.: US 9,568,696 B2
(45) Date of Patent: Feb. 14, 2017

(54) FIBER OPTIC CONNECTION BOX WITH CABLING BRIDGE FOR AFFIXING FIBER OPTIC CABLE SPLICE

(71) Applicant: All Systems Broadband, Inc., Livermore, CA (US)

(72) Inventors: Craig Dwayne Ray, Fuquay-Varina, NC (US); Iulius Cosmin Gordea, Holly Springs, NC (US)

(73) Assignee: All Systems Broadband, Inc., Livermore, CA (US)

( * ) Notice: Subject to any disclaimer, the term of this patent is extended or adjusted under 35 U.S.C. 154(b) by 0 days.

(21) Appl. No.: 15/145,837

(22) Filed: May 4, 2016

(65) Prior Publication Data

US 2016/0313523 A1 Oct. 27, 2016

Related U.S. Application Data

(63) Continuation of application No. 14/694,218, filed on Apr. 23, 2015, now Pat. No. 9,372,319.

(51) Int. Cl.
*G02B 6/00* (2006.01)
*G02B 6/44* (2006.01)
*G02B 6/38* (2006.01)

(52) U.S. Cl.
CPC ........ *G02B 6/4446* (2013.01); *G02B 6/3897* (2013.01); *G02B 6/445* (2013.01); *G02B 6/4478* (2013.01)

(58) Field of Classification Search
CPC ... G02B 6/4452; G02B 6/3897; G02B 6/4471; G02B 6/4453; G02B 6/4454; G02B 6/00
See application file for complete search history.

(56) References Cited

U.S. PATENT DOCUMENTS

| | | | |
|---|---|---|---|
| 7,599,597 B2 * | 10/2009 | Kerry | G02B 6/4466 385/134 |
| 2005/0250377 A1 | 11/2005 | Gorman et al. | |
| 2015/0364841 A1 | 12/2015 | Zhong et al. | |
| 2016/0013628 A1 | 1/2016 | Tanaka | |
| 2016/0105021 A1 * | 4/2016 | Murray | H02J 3/00 385/75 |

* cited by examiner

*Primary Examiner* — Jennifer Doan
(74) *Attorney, Agent, or Firm* — Murphy, Bilak & Homiller, PLLC

(57) ABSTRACT

A cabling bridge includes a planar platform section that is sized to be placed within a fiber optic termination box, an opening centrally located in the planar platform section, and separation features extending away from a bottom-side of the planar platform section. The separation features are configured to separate the planar platform section from a planar back section of the fiber optic termination box. The cabling bridge further includes a pair of protrusions extending from the planar platform section into the opening and towards one another so as to at least partially divide the opening into first and second wider regions, with a narrower region of the opening being arranged between the pair of protrusions. The opening's perimeter includes semi-circular boundaries transitioning between the protrusions and edge sides of the planar platform section that are opposite from the protrusions.

20 Claims, 11 Drawing Sheets

FIBER OPTIC CONNECTION BOX WITH CABLING BRIDGE FOR AFFIXING FIBER OPTIC CABLE SPLICE

PRIORITY CLAIM

This application is a continuation of U.S. application Ser. No. 14/694,218 filed 23 Apr. 2015, the content of said application incorporated herein by reference in its entirety.

TECHNICAL FIELD

The present invention generally relates to optical communications equipment, and particularly relates to fiber demarcation boxes that are used for the storage of fiber optic cables.

BACKGROUND

Today's communication networks provide transport of voice, video and data to both residential and commercial customers, with more and more of those customers being connected by fiber optic cables. In these communication networks, information is transmitted from one location to another by sending pulses of light through the fiber optic cables. Fiber optic transmission provides several advantages over electrical transmission techniques, such as increased bandwidth and lower losses.

Fiber optic connection boxes are used in fiber optic networks to store and secure a fiber optic connection and associated lengths of fiber optic cabling. These fiber optic connections include physical splices of optical fibers and other standardized connections, such as SC connections. For example, the customer-side fiber optic cabling, which comes from the customer's building, can be connected with the service-provider network cabling, which is external to the customer's building. Both the customer-side fiber optic cabling and the service-provider cabling are routed into the connection box with some extra slack to allow for easy manipulation of the cabling. The connection is then effectuated and the excess lengths of fiber optic cabling are secured within the connection box. Optical circuitry (either passive or active) may be connected with the spliced cable and also stored within the connection box.

There are several important considerations in the design of a fiber optic connection box. For example, the most brittle parts of the fiber optic cabling should be protected from other items stored within the connection box. Many installations utilize fiber optic cable with very little protection for the optical fibers. The potential exists that these relatively vulnerable lengths of cabling may chafe against other items in the connection box, such as jacketed fiber optic cabling, which is more rugged. Furthermore, if the connection involves a splice, the splice should be protected from exterior pulling forces that are applied from outside of the connection box. Examples of pulling forces include pressure applied by installers at an opposite end of the cable and thermal expansion/contraction of the cable due to changes in temperature.

One important design consideration for fiber optic connection boxes is the space efficiency. The number and volume of the fiber optic cables utilized in modern fiber optic networks continues to grow in response to the need for increased bandwidth. In some instances, the network is built out such that there is little or no room to increase the size of the connection box. However, the need to optimize space efficiency can conflict with other considerations. For example, a fiber optic connection box that is too small suffers from the drawback that the likelihood of chafing between the fiber optic cabling is higher because the cabling is more densely packed.

Thus, there is a need to provide a connection box that is used to secure and store a splice between service-provider cabling and customer-side fiber optic cabling in a space efficient manner while protecting the cabling from damage.

SUMMARY

A connection box for securing and storing a connection between service-provider-side fiber optic cabling and customer-side fiber optic cabling is disclosed. According to an embodiment, the connection box includes a planar back section, outer sidewalls adjoining the planar back section and having front edges being spaced apart from the back section in a depth direction of the connection box, the depth direction being perpendicular to the back section. The connection box further includes a front door that is configured to be fixedly attached to the connection box at the front edges of the outer sidewalk so as to enclose an interior space of the connection box, the interior space being defined by the back section, the outer sidewalk and the front door. The connection box further includes a cabling bridge arranged within the interior space. The cabling bridge includes a planar platform section arranged between the planar back section and the front edges in the depth direction so as to divide the interior space into first and second interior volumes, an opening in the platform section providing a conduit in the depth direction between the first and second interior volumes, and a protective collar arranged along a portion of the opening's perimeter. The protective collar extends from the platform section and towards the front edges in the depth direction.

According to another embodiment, the connection box includes a planar back section, outer sidewalls adjoining the planar back section and having front edges being spaced apart from the back section in a depth direction of the connection box, the depth direction being perpendicular to the back section. The connection box further includes a front door that is configured to be fixedly attached to the connection box at the front edges of the outer sidewalk so as to enclose an interior space of the connection box, the interior space being defined by the back section, the outer sidewalls and the front door. The connection box further includes a cabling bridge arranged within the interior space. The cabling bridge includes a planar platform section having an outer perimeter that is dimensioned to be placed within the connection box, an opening in the platform section providing a conduit in the depth direction between the first and second interior volumes, and a pair of protrusions extending from the planar platform section into the opening and towards one another so as to at least partially divide the opening into first and second wider regions. A narrower region of the opening is arranged between the pair of protrusions.

A cabling bridge for securing and organizing fiber optic cabling within a fiber optic termination box is disclosed. According to an embodiment, the cabling bridge includes a planar platform section that is sized to be placed within a fiber optic termination box, an opening centrally located in the planar platform section, and separation features extending away from a bottom-side of the planar platform section. The separation features are configured to separate the planar platform section from a planar back section of the fiber optic termination box. The cabling bridge further includes a pair of protrusions extending from the planar platform section into the opening and towards one another so as to at least partially divide the opening into first and second wider regions, with a narrower region of the opening being arranged between the pair of protrusions. The opening's perimeter includes semi-circular boundaries transitioning between the protrusions and edge sides of the planar platform section that are opposite from the protrusions.

According to another embodiment, the cabling bridge includes a planar platform section that is sized to be placed within a fiber optic termination box, an opening centrally located in the planar platform section, and separation features extending away from a bottom-side of the planar platform section. The separation features are configured to separate the planar platform section from a planar back section of the fiber optic termination box. The cabling bridge further includes a bend control extending away from the planar platform section in an opposite direction as the separation features. The bend control is configured to limit a bend radius of a section of the optic cabling that is pivoted around an outward facing bend-limiting surface of the bend control.

A fiber optic network assembly is disclosed. According to an embodiment, the assembly includes a planar back section, outer sidewalls adjoining the planar back section and having front edges being spaced apart from the back section in a depth direction of the connection box, the depth direction being perpendicular to the back section, and a front door that is fixedly attached to the connection box at the front edges of the outer sidewalls so as to enclose an interior space of the connection box, the interior space being defined by the back section, the outer sidewalls and the front door. The assembly further includes a cable port in one of the outer sidewalls, and a cabling bridge arranged within the interior space. The cabling bridge includes a planar platform section arranged between the back section and the front edge sides in the depth direction and extending parallel to the back section so as to divide the interior space into first and second interior volumes, an opening in the platform section providing a conduit in the depth direction between the first and second interior volumes, and a protective collar arranged along a portion of the opening's perimeter. The protective collar extends from the platform section and towards the front edges in the depth direction. The assembly further includes a length of service-provider-side fiber optic cabling feeding into the cable port, a length of customer-side fiber optic cabling feeding into an opening in the floor section, and a connection between the service-provider-side fiber optic cabling and the customer-side fiber optic cabling that is affix to the cabling bridge.

A method of connecting and storing customer-side fiber optic cabling with service-provider-side fiber optic cabling is disclosed. According to an embodiment, the method includes providing a connection box, having a planar back section, outer sidewalls adjoining the back section, a front door that is configured to be fixedly attached to front edges of the outer sidewalls so as to enclose an interior space of the connection box, a cable port in one of the outer sidewalls, and a cabling bridge arranged within the interior space, the cabling bridge having a planar platform section dividing the interior space into first and second interior volumes and an opening providing a conduit between the first and second interior volumes. The method further includes routing the customer-side fiber optic cabling into the connection box, routing the service-provider-side fiber optic cabling through one of the cable ports, and connecting the service-provider-side fiber optic cabling together with the customer-side fiber optic cabling, and affixing the connection to the cabling bridge.

Of course, the present invention is not limited to the above features and advantages. Indeed, those skilled in the art will recognize additional features and advantages upon reading the following detailed description, and upon viewing the accompanying drawings.

DETAILED DESCRIPTION

Embodiments described herein provide a connection box for securing and storing a connection between customer-side fiber optic cabling and service-provider-side fiber optic cabling and a corresponding method of connecting fiber optic cabling and storing excess lengths of cabling inside the connection box. The connection box is a three dimensional enclosure with a planar floor section, outer sidewalk adjoining and extending away from the floor section, and a front door. When the front door is in a shut position, the connection box encloses an interior space being defined by the floor section, the outer sidewalls and the front door.

The connection box advantageously includes a cabling bridge that can be arranged within the interior space of the connection box. The cabling bridge includes several features that allow for a fiber optic splice to be securely stored in a space efficient and damage resistant manner.

First, the cabling bridge includes planar platform section that can be positioned between the floor section and the front door and extends parallel to the floor. In this arrangement, the planar platform section divides the interior space into first and second interior volumes. The first interior volume may be used to store an excess length (e.g., a coil) of service-provider-side fiber optic cabling and the second interior volume may be used to store an excess length (e.g., a of the customer-side fiber optic cabling. This configuration improves space efficiency, as the two excess lengths of cabling vertically overlap with one another.

Further, the planar platform section can be used to prevent the more brittle lengths of fiber optic cabling, such as 250 µm "bare" fiber or 900 µm pigtail cabling, from more rugged lengths of fiber optic cabling, such as 5 mm jacketed indoor fiber optic cable. An opening in the planar platform allows for the cabling to transition from the coils of cabling to the fiber optic connection with minimal bending and pressure applied to the cabling. Advantageously, a protective collar is arranged along a portion of the opening's perimeter. The protective collar raises the elevation of the more rugged fiber optic cabling and allows the more brittle fiber optic cabling to transition to and from the fiber connection without contacting the more rugged fiber optic cabling.

Finally, the cabling bridge includes a bend control that limits the amount of leverage that the customer-side fiber optic cabling that is outside of the connection box can exert over the cabling and fiber optic connection that is stored in the connection box. The bend control eliminates the possibility that the customer-side fiber optic cabling will be pinched around an acute angle when pulled by external forces.

Figure 1:
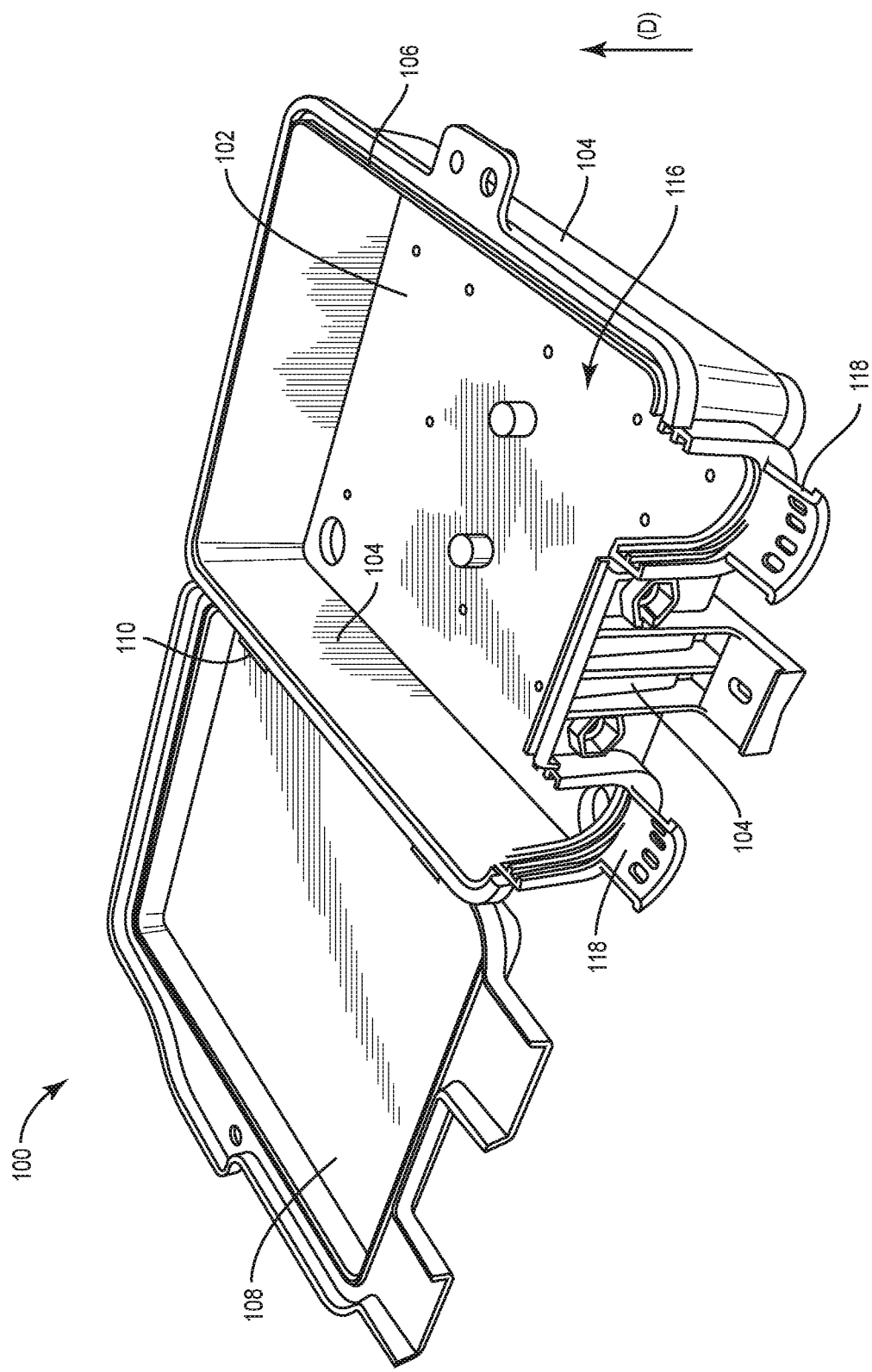
FIG. 1 depicts a connection box for securing and storing fiber optic connections, from a diagonal view perspective and with the front door being in an open position, according to an embodiment.

Referring to FIG. 1, a connection box 100 is depicted. The connection box 100 includes a planar back section 102 providing the floor of the connection box 100. The planar back section 102 extends substantially along a single plane. The connection box 100 further includes outer sidewalls 104 that adjoin the planar back section 102 and extend away from the planar back section 102 in a depth direction (D) of the connection box 100. The depth direction (D) is perpendicular to the plane of the planar back section 102. The outer sidewalls 104 include front edges 106 that are spaced apart from the planar back section 102 in the depth direction (D). That is, the front edges 106 are vertically separated from the planar back section 102. The outer sidewalk 104 may form a ninety degree angle with the planar back section 102. Alternatively, the outer sidewalls 104 may form an oblique angle with respect to the planar back section 102. As shown in FIG. 1, the planar back section 102 is rectangular shaped, with four outer sidewalls 104 adjoining the planar back section 102. However, any of a variety of geometries may be utilized as the basic shape of the connection box 100.

The connection box 100 further includes a front door 108. The front door 108 may be substantially planar, and may have a similar or identical geometry as the planar back section 102. According to embodiment, the front door 108 is affixed to the outer sidewalls 104 of the connection box 100 by hinges 110 so as to allow the front door 108 to pivot around one of the front edges 106 of the outer sidewalls 104. Alternatively, the front door 108 may be detached or detachable from the outer sidewalls 104. That is, the hinged connection is optional.

Figure 2:
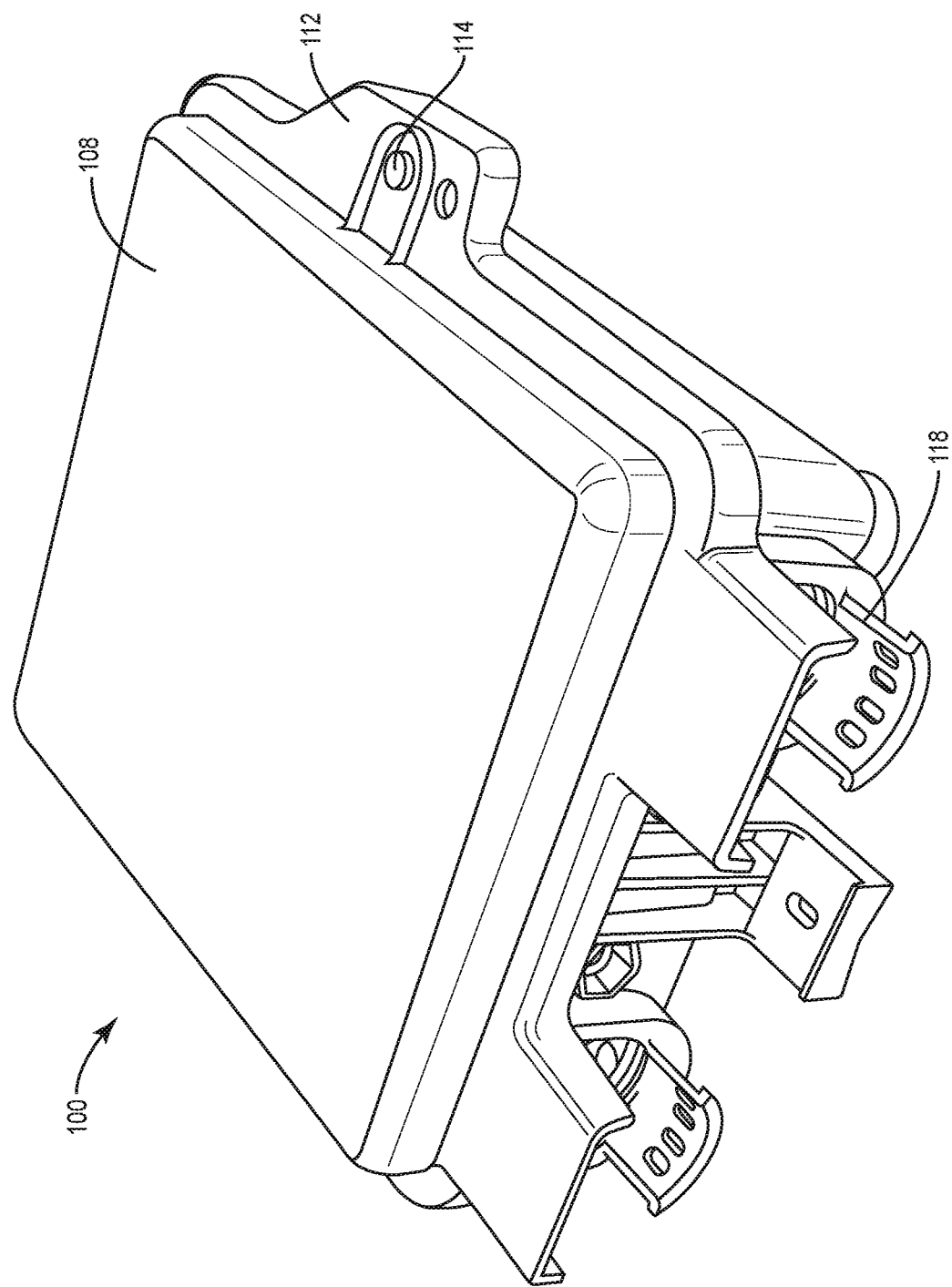
FIG. 2 depicts a connection box for securing and storing fiber optic connections from a diagonal view perspective with the front door being in a shut position, according to an embodiment.

Referring to FIG. 2, the connection box 100 is depicted with the front door 108 in a shut position. The front door 108 is configured to be fixedly attached to the connection box 100 at the front edges 106 of the outer sidewalls 104. For example, the front door 108 can include features that interlock with the front edges 106. According to an embodiment, the perimeter of the front door 108 includes features that engage or snap in with the front edges 106 of the outer sidewalls 104 to provide a fixed attachment between the two. In addition or in the alternative, the front door 108 can be screwed shut against the front edges 106 of the outer sidewalls 104. According to an embodiment, the front door 108 and the outer sidewalls 104 include a screw mounting tab 112 and corresponding perforation that allows for a screw 114 to provide a fixed attachment between the two.

When the front door 108 is in the shut position, the connection box 100 encloses a three-dimensional interior space 116. This interior space 116 is defined by the planar back section 102, the outer sidewalls 104 and the front door 108. Thus, the connection box 100 is configured to house a volume and protect the elements arranged within this volume from external environmental conditions.

According to an embodiment, the connection box 100 includes a cable port 118 formed in one of the outer sidewalk 104. For example, as shown in FIGS. 1-2, the connection box 100 includes two cable ports 118 arranged near opposing corners of one of the sidewalls 104. The cable ports 118 provide access to the interior space 116 for the routing of fiber optic cabling into the interior space 116 without opening the front door 108.

Figure 3:
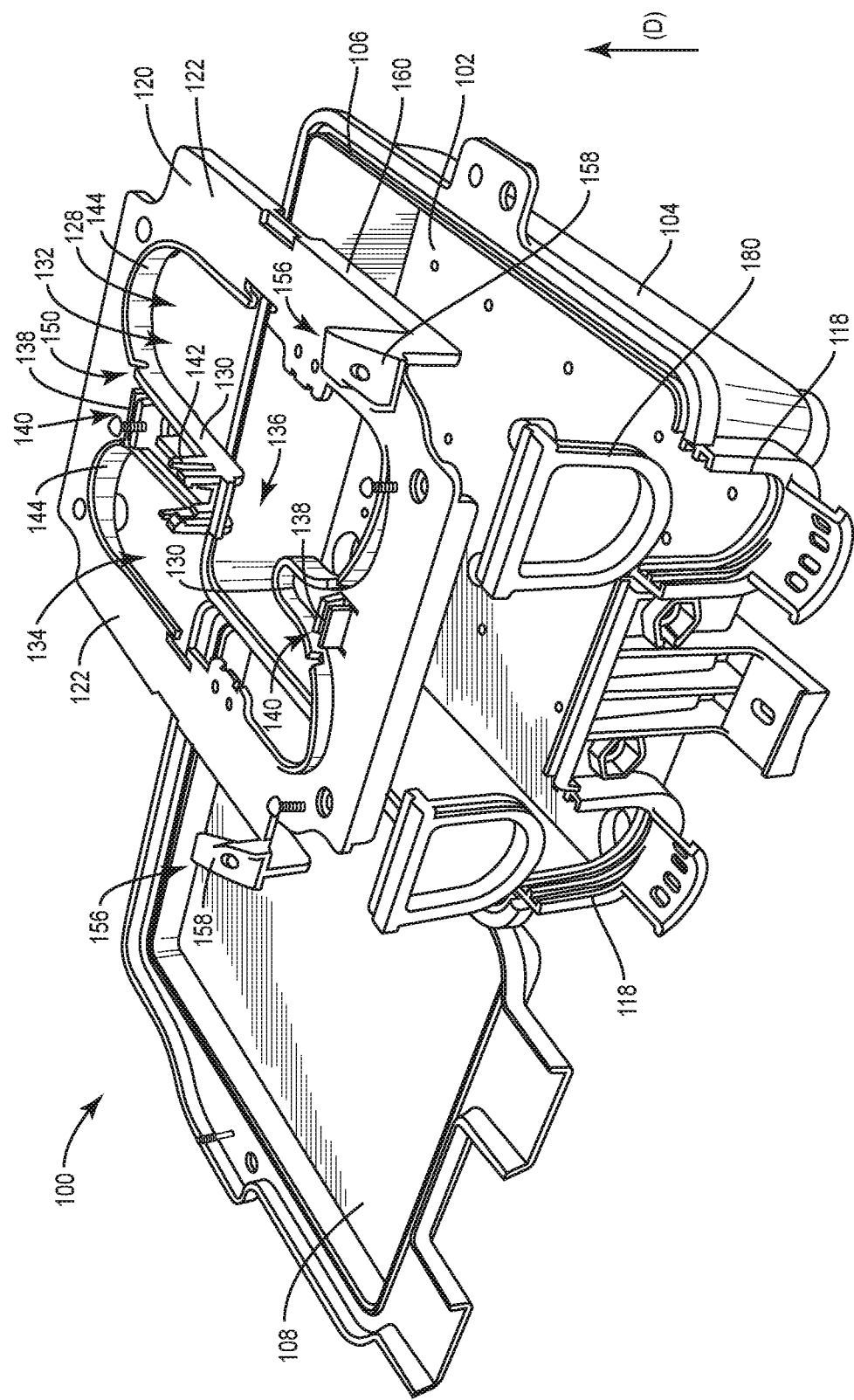
FIG. 3 depicts a connection box with a cabling bridge from a diagonal view perspective, according to an embodiment.

Referring to FIG. 3, a cabling bridge 120 for the connection box 100 is depicted. In the depicted embodiment, the cabling bridge 120 is a discrete structure that is removed from the interior space 116 of the connection box 100. That is, in the embodiment of FIG. 3, the cabling bridge 120 is not permanently affixed to the outer sidewalls 104, the planar back section 102 and the front door 108. In this embodiment, the cabling bridge 120 is dimensioned to be placed in the connection box 100 and remain flush against the outer sidewalls 104 and/or the planar back section 102 thereafter. The cabling bridge 120 may also be securely affixed to the outer sidewalls 104 and/or the planar back section 102 by screws or bolts. According to another embodiment, the cabling bridge 120 is permanently affixed to the outer sidewalls 104 such that the cabling bridge 120 is not removable from the interior space 116. For example, the cabling bridge 120 may be adhesively bonded to the outer sidewalls 104. According to another embodiment, the cabling bridge 120 may be an integrally formed component of the same structure that includes the outer sidewalls 104 and the planar back section 102.

Figure 4:
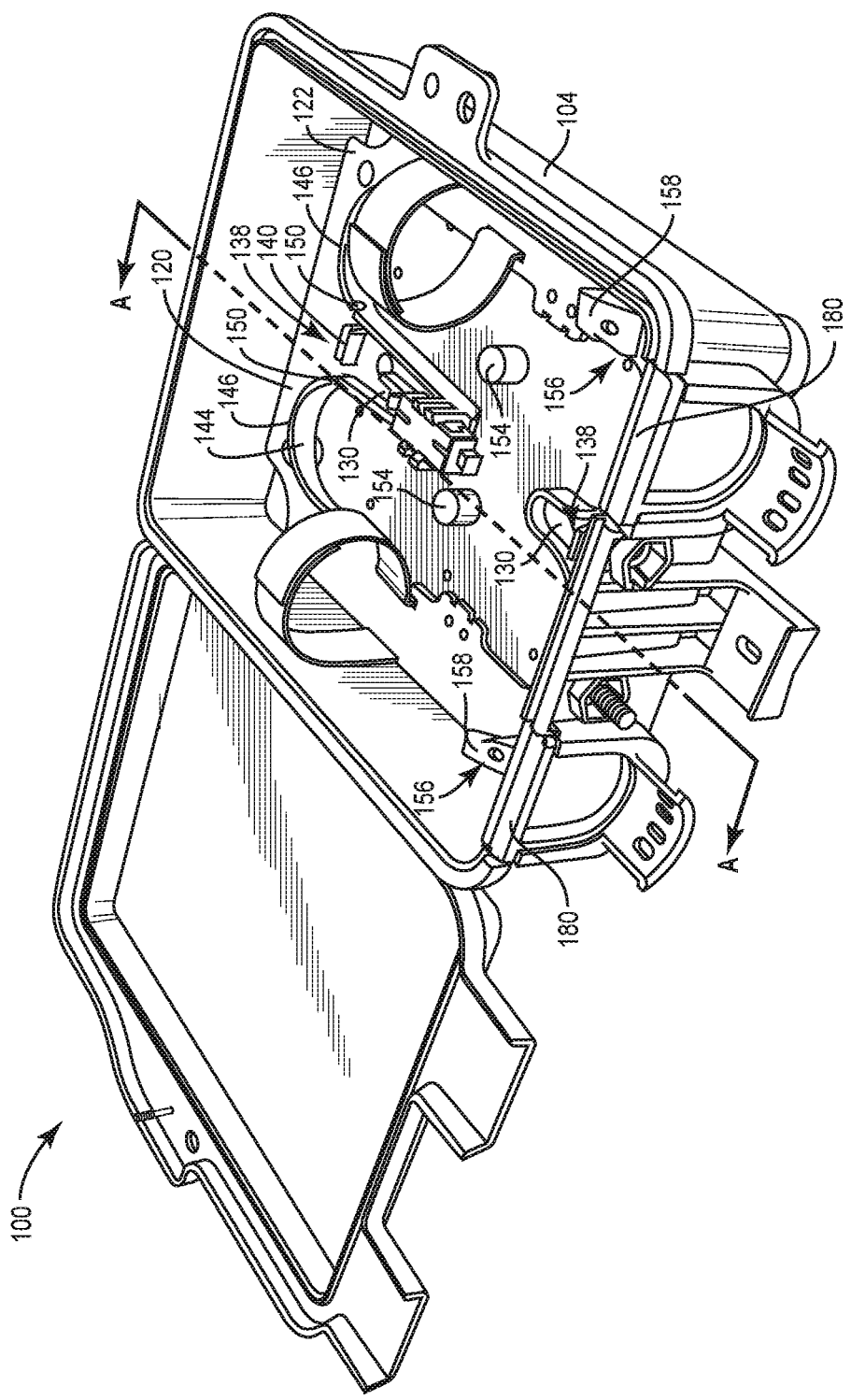
FIG. 4 depicts a connection box with the cabling bridge arranged within the interior space of the connection box from a diagonal view perspective, according to an embodiment.
Figure 5:
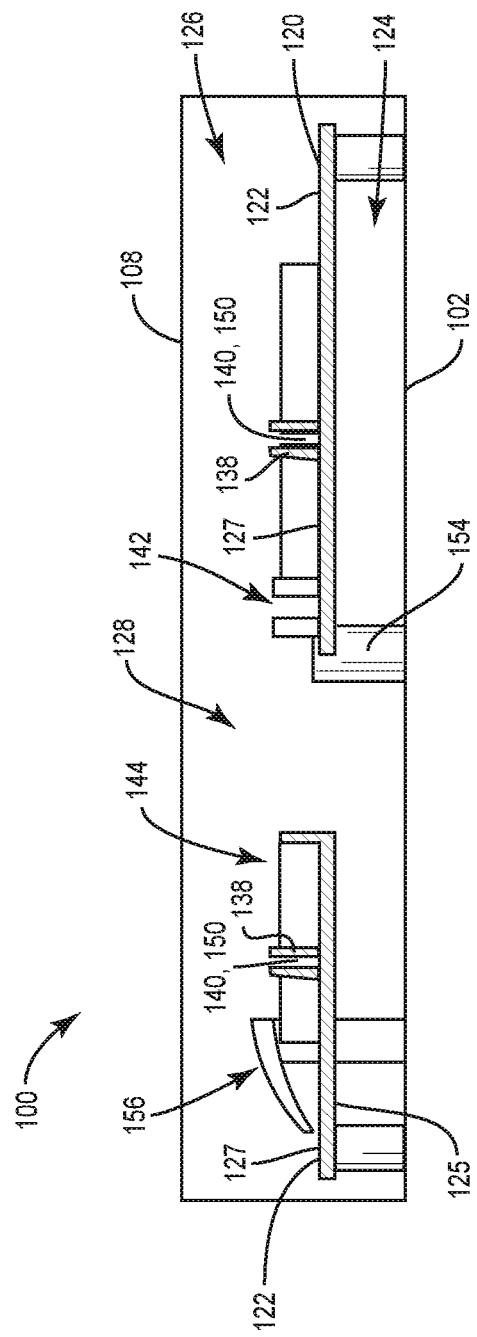
FIG. 5 depicts a connection box with the cabling bridge arranged within the interior space of the connection box from a sectional view perspective, according to an embodiment.
Figure 6:
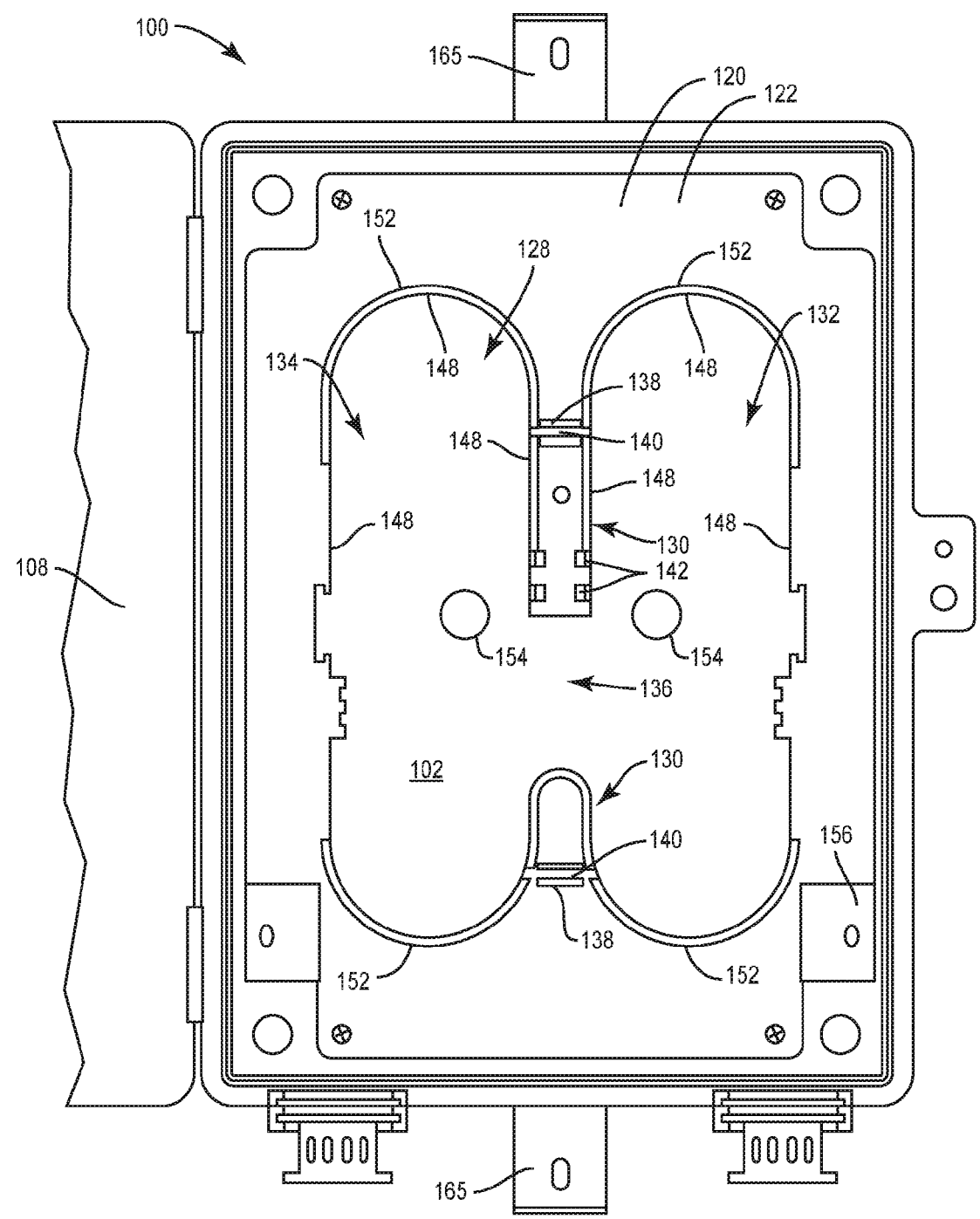
FIG. 6 depicts a connection box with the cabling bridge arranged within the interior space of the connection box from a plan-view perspective, according to an embodiment.

FIGS. 4, 5 and 6 depict the connection box 100 with the cabling bridge 120 being arranged within the interior space 116. FIG. 4 depicts a diagonal elevated view of the connection box 100 and FIG. 5 depicts a cross-sectional view of the connection box 100 along the cross-sectional line A-A depicted in FIG. 4. FIG. 6 depicts the connection box 100 from a plan-view perspective.

The cabling bridge 120 includes a planar platform section 122. As shown in FIGS. 4, 5 and 6, the planar platform section 122 is arranged between the planar back section 102 and the front edges 106 in the depth direction (D). Thus, the cabling bridge 120 provides a platform that can be spaced above the planar back section 102 and below the front edges 106. According to embodiment, the planar platform section 122 is parallel to the planar back section 102 and is perpendicular to the depth direction (D). The planar platform section 122 divides the interior space 116 into first and second interior volumes 124, 126. That is, the platform section provides two separate three-dimensional regions within the connection box 100 that vertically overlap with one another. The first interior volume 124 occupies the three-dimensional space between the planar back section 102 and a bottom-side 125 of the planar platform section 122. The second interior volume 126 occupies the three-dimensional space between a top-side 127 of the planar platform section 122 and the front door 108 (when the front door 108 is in the shut position).

The cabling bridge 120 includes at least one opening 128 in the planar platform section 122. The opening 128 provides a conduit in the depth direction (D) between the first and second interior volumes 124, 126. Thus, the first interior volume 124 is accessible from the opening 128 when the cabling bridge is placed in the connection box 100. The opening 128 may be centrally located in the planar platform section 122.

According to an embodiment, the planar platform section 122 includes a pair of protrusions 130 extending into the opening 128 and towards one another so as to at least partially divide the opening 128 into first and second wider regions 132, 134. According to an embodiment, the protrusions 130 extend parallel to the planar back section 102 and maintain the same plane as the planar platform section 122. The protrusions 130 may only partially divide the opening 128. That is, the protrusions 130 do not necessarily extend completely across the planar platform section 122. As a result, there is a narrower region 136 of the opening 128 arranged between the pair of protrusions 130 and between the first and second wider regions 132, 134. According to an alternate embodiment, the cabling bridge 120 includes one structure that forms a complete bridge across the opening 128.

The cabling bridge 120 further includes structures for securing a fiber optic connection on the protrusions. By arranging these structures on the protrusions, the fiber optic cabling feeding into the connections is able to directly transition into the opening 128 without any obstructions. For example, the cabling bridge 120 may include a pair of the splice holders 138, with each one of the splice holders 138 being arranged on opposite facing ones of the protrusions 130. The splice holders 138 extend away from the planar platform section 122 and towards the front edges 106 in the depth direction (D). That is, the splice holders 138 protrude away from the cabling bridge 120. Each of the splice holders 138 includes a splice receptacle 140 that is configured to secure a splice of fiber optic cabling. The splice receptacle 140 may be configured as a linear notch, for example. The linear notch allows a cylindrical structure, such as a fiber optic splice protector, to snap into the linear notch and remain securely in place thereafter.

The cabling bridge 120 may also include an adapter receptacle 142 on one of the protrusions 130. The adapter receptacle 142 is configured to insertably receive a standardized fiber optic cabling adapter. Examples of standardized fiber optic cabling adapters include SC and LC connectors. The adapter receptacle 142 is dimensioned complimentary to the standardized fiber optic cabling adapters (when connected with one another) such that the standardized fiber optic cabling adapters can be securely affixed to the adapter receptacle 142.

The cabling bridge 120 further includes a protective collar 144 extending from the planar platform section 122 and towards the front edges 106 in the depth direction (D). That is, the protective collar 144 protrudes away from the cabling bridge 120. The protective collar 144 may be a ridge-like structure with planar surfaces extending perpendicular to the planar platform section 122 and a top edge 146 that is parallel to the planar platform section 122.

The protective collar 144 is arranged along a portion of the perimeter 148 of the opening 128. That is, the protective collar 144 is formed at an edge side of the cabling bridge 120 that is coextensive with the opening 128. The protective collar 144 may be directly located at the perimeter 148. According to another embodiment, the protective collar 144 is set back from the perimeter 148. The protective collar 144 extends past the splice receptacles 140 in the depth direction (D) such that the top side of the splice receptacle 140 is beneath the top edge 146 of the protective collar 144. Thus, an item, such as a coil of jacketed fiber optic cabling, may lie against the top edge 146 of the protective collar 144 and be simultaneously above the splice receptacles 140.

According to an embodiment, the protective collar 144 is arranged along a portion of the opening's perimeter 148 that includes a boundary between the protrusions 130 and the opening 128. That is, the protective collar 144 lines the perimeter 148 of the opening 128 that is coextensive with the protrusions 130. The protective collar 144 may include notches 150 that are adjacent to and laterally aligned with each splice receptacle 140 in the pair. The notches 150 provide a section of the protective collar 144 that is offset from the top edge 146 and may be coplanar with the splice receptacle 140, with respect to the depth direction (D).

According to an embodiment, the opening's perimeter 148 includes semi-circular boundaries 152. More particularly, the opening 128 includes two semi-circular boundaries 152 in the first wider region 132 and two semi-circular boundaries 152 in the second wider region 134. The semi-circular boundaries 152 transition between the protrusions 130 and edge sides of the planar platform section 122 that are opposite from the protrusions 130.

According to an embodiment, the protective collar 144 continuously extends from the boundary between the protrusions 130 and the opening 128 to the semi-circular boundary 152. That is, the protective collar 144 is a continuous structure that extends along at least a section of the perimeter 148 of the openings 128 that is adjacent to the protrusions 130 and the semi-circular boundaries 152. Optionally, the protective collar 144 may continuously extend around the complete perimeter 148 of the opening 128.

The connection box 100 may further include posts 154 adjoining and extending away from the planar back section 102 and towards the front edges 106 in the depth direction (D). The posts 154 may be cylindrically shaped with a gentle slope at a top side of the posts 154. Any number of posts 154 may be provided, such as two three, four, etc. The posts 154 are arranged such that a length of fiber optic cabling can be coiled in the first interior volume 124 around the posts 154.

According to an embodiment, the cabling bridge 120 includes a bend control 156 extending away from the planar platform section 122 and towards the front edges 106 in the depth direction (D). The bend control 156 is configured to limit a bend radius of fiber optic cabling that feeds into the interior space 116 through the planar back section 102. This is at least partially attributable to the geometry and orientation of a bend-limiting surface 158 on the bend control 156. The bend-limiting surface 158 may be planar or curved, and is inclined relative to the planar back section 102.

According to an embodiment, the cabling bridge 120 includes lower sidewalls 160 (depicted in FIG. 3) extending in an opposite direction as the protective collar 144. That is, when the cabling bridge 120 is secured in the connection box 100, the lower sidewalls 160 extend away from the planar platform section in the depth direction (D) so as to elevate the planar platform section 122 above the planar back section 102. Thus, in an embodiment in which the cabling bridge 120 is insertable into the connection box 100, the lower sidewalls 160 ensure a separation distance between the planar platform section 122 and the planar back section 102. This separation distance provides the first interior volume 124. Other structures may be provided on the cabling bridge 120 in lieu of the lower sidewalls 160. For example, the cabling bridge 120 may have pillars that provide the necessary separation distance between the planar platform section 122 and the planar back section 102. Alternatively, in an embodiment which the cabling bridge 120 is an integrally formed component of the connection box 100, structures such as the lower sidewalls 160 and/or pillars may be eliminated.

The cabling bridge 120 may be dimensioned such than an outer perimeter of the cabling bridge 120, which is opposite from the outer perimeter 148 of the opening 128, is flush against the outer sidewalls 104 when the lower sidewalls 160 contact the planar back section 102. Thus, in an embodiment in which the cabling bridge 120 is insertable into the connection box 100, the cabling bridge 120 can be placed in the interior space 116 of the network interface and will remain in place thereafter due to pressure applied between the outer sidewalk 104 and the outer perimeter of the cabling bridge 120.

An exemplary installation and connection of fiber optic cabling using the connection box 100 described herein will now be discussed.

Figure 7:
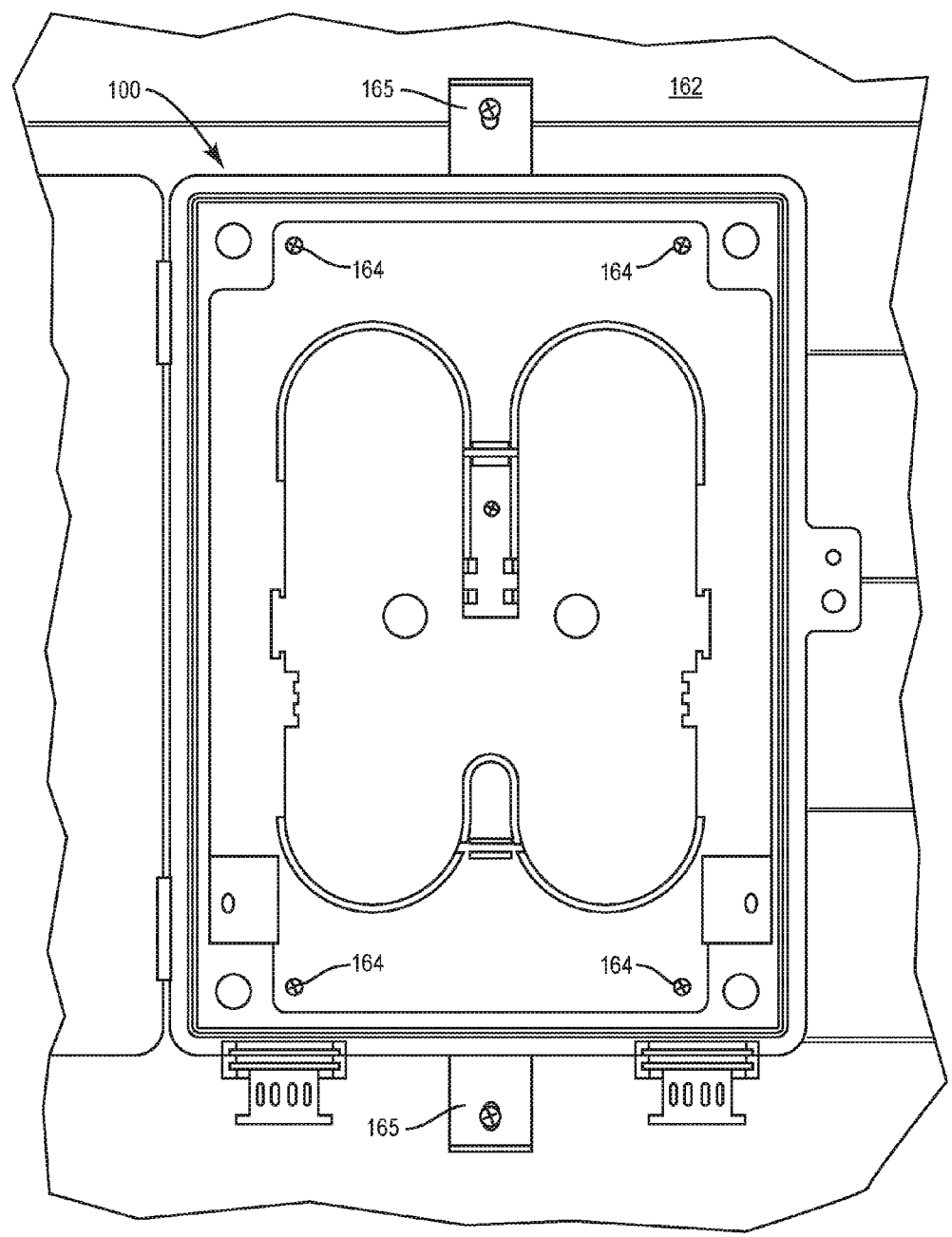
FIG. 7 depicts a connection box that is mounted to a customer building, according to an embodiment.

Referring to FIG. 7, the connection box 100 has been secured to an exterior wall 162 of a customer building, such as a residence or commercial property by a fastener 164. The fastener 164 may be a screw or bolt, for example. The fastener 164 may be interested through pre-fabricated perforations in the connection box 100, or may be drilled through any available surface. Additionally, the connection box 100 may be secured to the exterior wall 162 using mounting tabs 165 and corresponding fasteners inserted through the mounting tabs.

Figure 8:
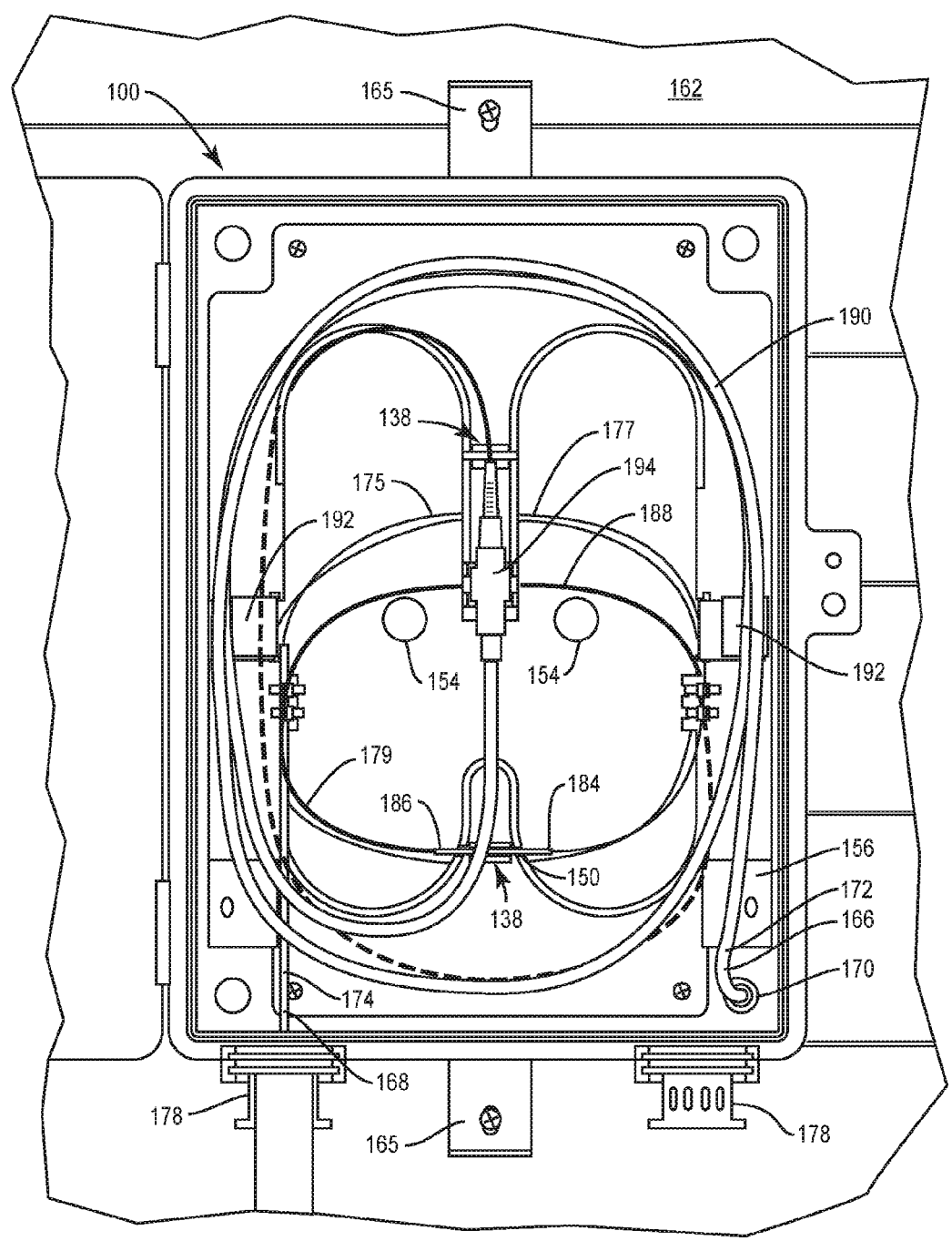
FIG. 8 depicts a connection box with a connection between customer-side fiber optic cabling with service-provider-side fiber optic cabling secured and stored within the connection box, according to an embodiment.

Referring to FIG. 8, a fiber optic connection has been effectuated and excess lengths of fiber optic cable have been stored within the connection box 100. More particularly, a length of service-provider-side fiber optic cabling 168 coming from a remote location (e.g., a service-provider network) is fed into the interior space 116 of the connection box 100. The service-provider-side fiber optic cabling 168 may be fed through one or both of the entry ports 118. Optionally, a conduit 178, such as a PCV conduit, may be directly affixed to one entry ports 118 such that the service-provider-side fiber optic cabling 168 is enclosed through the transition into the connection box 100.

According to an embodiment, the service-provider-side fiber optic cabling 168 that is fed into the connection box 100 is 5 mm cable having a durable exterior jacket surrounding and protecting 250 µm optical fibers. A first length 174 of the service-provider-side fiber optic cabling 168 that includes the durable exterior jacket is secured to the cabling bridge 120, e.g., using zip ties. A second length 175 of the service-provider-side fiber optic cabling 168 is exposed from the durable exterior jacket. The second length 175 consists of 250 µm exposed optical fibers. The second length 175 feeds from the first length 174 into the first interior volume 124. That is, the second length 175 transitions from the fastening point of the service-provider-side fiber optic cabling 168, which is in the second interior volume 126, through the opening 128 into the first interior volume 124.

As shown in the embodiment of FIG. 8, the second length 175 of the service-provider-side fiber optic cabling 168 that is arranged in the first interior volume 124 has been coiled, i.e., organized in a joined sequence of circles or rings. Thus, a first coiled section 177 of exposed optical fibers is arranged in the first interior volume 12. The first coiled section 177 is retained between the planar back section 102 and the cabling bridge 120. The pair of posts 154 extending away from the planar back section 102 provide a fixed location to coil the second length 175 of service-provider-side fiber optic cabling 168 such that the first coiled section 177 is not allowed to laterally drift within the first interior volume 124. Further, the spacing between the posts 154 maintains an adequate diameter for the first coiled section 177 to minimize the acute bending of the exposed optical fibers. Thus, the possibility of damage to the exposed optical fibers is minimized.

As further shown in the embodiment of FIG. 8, the second length 175 of the service-provider-side fiber optic cabling 168 feeds from first coiled section 177 into a splice 184. According to an embodiment, the second length 175 of the service-provider-side fiber optic cabling is spliced together with a so-called "pigtail cable," i.e., a fiber optic cable with exposed or expose-able optical fiber at one end and a standardized connector at the opposite end. The pigtail cable 179 may have a thin exterior jacket, and may have a diameter of 900 µm, for example. The splice 184 between the service-provider-side fiber optic cabling 168 and the pigtail cable 179 may be effectuated according to commonly known techniques. The splice 184 is affixed to the cabling bridge 120 so as to be securely positioned within the interior space 116 of the connection box 100. This may be done using one of the two splice holders 138. According to an embodiment, a fiber optic splice protector 186 is placed around the splice 184 and inserted into the splice receptacle 140. The splice receptacle 140 is dimensioned complementarily to the splice protector 186 such that the splice protector 186 snaps in securely and the splice 184 remains affixed to the cabling bridge 120 thereafter.

The pigtail cable 179 feeds away from the splice 184 and transitions from the second interior volume 126 back into the first interior volume 124. The pigtail cable 179 has been coiled around the posts 154 into a second coiled section 188 in a similar manner as described above with reference to the first coiled section 177. The second coiled section 188 is retained between the planar back section 102 and the cabling bridge 120, with the posts providing a fixed point for the second coiled section 108 of the pigtail cable 179 to circle around.

The pigtail cable 179 is connected with the customer-side fiber optic cabling 166 using a standardized adapter 194, with this adapter 194 being affixed to the adapter receptacle 142. According to an embodiment, the pigtail cable 179 and the customer-side fiber optic cabling 166 include SC connectors at one end. Each of these SC connectors is mated with the adapter 194 to complete the fiber optic connection between the service-provider and customer networks.

The customer-side fiber optic cabling 166 originates from the customer's building to which the connection box 100 is affixed. The customer-side fiber optic cabling 166 may be an interior fiber optic cable having a relatively durable exterior jacket, such as a plenum or Polyvinyl Chloride (PVC) exterior jacket. The customer-side fiber optic cabling 166 may have a diameter (including the exterior jacket) of between 300 and 750 µm. Alternatively, the customer-side fiber optic cabling 166 may be a so-called flat drop style cabling. The customer-side fiber optic cabling 166 is routed through a cable entry opening 170 in the planar back section 102 of the connection box 100. The cable entry opening 170 may be formed by drilling a hole in the planar back section 102. The location of the cable entry opening 170 may vary, depending upon what is preferred by the installer. According to an embodiment, the cable entry opening 170 is formed adjacent the bend control 156. In this region, the outer perimeter of the cabling bridge 120 is laterally spaced apart from the outer sidewalls 104. Thus, there is clearance between the cabling bridge 120 and the outer sidewalls 104 to route the customer-side fiber optic cabling 166 directly into the second interior volume 126. The bend control 156 is arranged at or near the portion of the planar platform section 122 that is spaced apart from the outer sidewall 104 such that the customer-side fiber optic cabling 166 can be tightened against the bend control 156. A length 172 of the customer-side fiber optic cabling 166 that extends away from the cable entry opening 170 is secured against the bend-limiting surface 158 of the bend control 156. This can be done, e.g., using a zip-tie.

According to an embodiment, an excess length of the customer-side fiber optic cabling 166 between the splice 184 and the cable entry opening 170 has been coiled into a third coiled section 190. The third coiled section 190 of the customer-side fiber optic cabling 166 is arranged in the second interior volume 126 between the planar platform section 122 and the front door 108 (when the front door 108 is in a shut position). According to an embodiment, the connection box 100 includes straps 192 configured to wrap third coiled section 190 of the customer-side fiber optic cabling 166 and affix third coiled section 190 against the cabling bridge 120. The straps 192 may be Velcro, for example. That is, after the coiling the customer-side fiber optic cabling 166, the third coiled section 190 may be tightened against the cabling bridge 120 using the straps.

Advantageously, the configuration of the cabling bridge 120 prevents the first and second coiled sections 177, 188 of the service-provider-side fiber optic cabling 168 from contacting and chafing against the third coiled section 190 of the customer-side fiber optic cabling 166. Because the planar platform section 122 is interposed between the coils, it provides a protective barrier. If for example, the first coiled section 177 of the service-provider-side fiber optic cabling 168 is 250 μm exposed fiber, the second coiled section 188 is 900 μm pigtail cabling, and the third coiled section 190 of the customer-side fiber optic cabling 166 is formed from 5 mm interior fiber optic cabling, the planar platform section 122 prevents the more brittle loose buffer tube cabling from being damaged by the jacketed interior fiber optic cabling.

Furthermore, the configuration of the protective collar 144 and the splice receptacle 140 advantageously prevents the third coiled section 190 of the customer-side fiber optic cabling 166 contacting and potentially damaging the splice 184 and the lengths of cabling extending away from the splice 184. Because the protective collar 144 extends past the splice receptacles 140 in the depth direction (D), the splice 184 and splice protector 186 are arranged beneath the top edge 146 of the protective collar 144 in the depth direction (D). The notches 150 in the protective collar 144 allow the cabling extending away from the splice 184 (i.e., the second length 175 of the service-provider-side fiber optic cabling 168 or the pigtail cable 179) to rest in the protective collar 144 beneath the top edge 146. The third coiled section 190 of the customer-side fiber optic cabling 166 rests on the protective collar 144 and overlaps with the length of cabling feeding into the splice 184. Thus, the third coiled section 190 of the customer-side fiber optic cabling 166 is separated from the splice 184 and the uncoiled length of service-provider-cabling extending away from the splice 184 by the protective collar 144.

The provision of two splice receptacles 140 in the connection box 100 provides flexibility to an installer when effectuating the splice 184. Instead of using the bottom one of the splice receptacle 140, as shown in FIG. 8, an installer has the further option to secure the splice 184 to the top one of the splice receptacles 140. This deemphasizes the importance of using exact lengths of fiber optic cabling in the connection box 100, as most of the excess length of fiber optic cable can be organized in the first coiled section 179, the second coiled section 188 or the third coiled 190 and the remaining excess length of fiber optic cable can be directly routed to the closest one of the splice receptacles 140.

The geometry of the opening 128 is conducive to a smooth transition of fiber optic cabling between the first and section interior volumes 124, 126. If, for example, the second length 175 of the service-provider-side fiber optic cabling 168 is 250 μm bare fiber, it should ideally be routed with minimal acute angles and pressure exerted on the fibers. The wide configuration of the opening 128 allows the second length 175 of the service-provider-side fiber optic cabling 168 to gradually bend as it transitions from the attachment point to the first coiled section 177 in the first interior volume 124. Furthermore, the semi-circular boundary 152 provides extra clearance for the lengths of fiber optic cabling extending away from the splice 184 to gradually arc in a direction parallel to the back section 102 (i.e., perpendicular to the depth direction (D)) as they transition into the first interior volume 124. Thus, the geometry of the opening 128 allows for a splice installation with minimal acute bending pressure applied to the fiber optic cabling.

The adapter receptacle 142 is positioned centrally with respect to the coils of fiber optic cabling. The service-provider-side fiber optic cabling 168 cabling extends away from the splice 184 and transitions into the second interior volume 126 by passing through the opening 128. Further, the customer-side fiber optic cabling 166 transitions from the splice 184 to the first coiled section 177 while remaining in the second interior volume 126. In a similar manner as described above, the customer-side fiber optic cabling 166 rests on the protective collar 144 and is separated from the splice 184 as well as the service-provider-side fiber optic cabling 168.

According to an advantageous embodiment, the posts 154 extend past the planar platform section 122 and through the openings 128 in the depth direction (D). That is, the height of the posts 154, relative to the back section 102, exceeds the height of the planar platform section platform section 122, relative to the back section 102. This arrangement eliminates the possibility that the first and second coiled sections 177, 188 may escape from the first interior volume 124 due to lateral or vertical movement of the coiled sections 177, 188 within the connection box.

Figure 9:
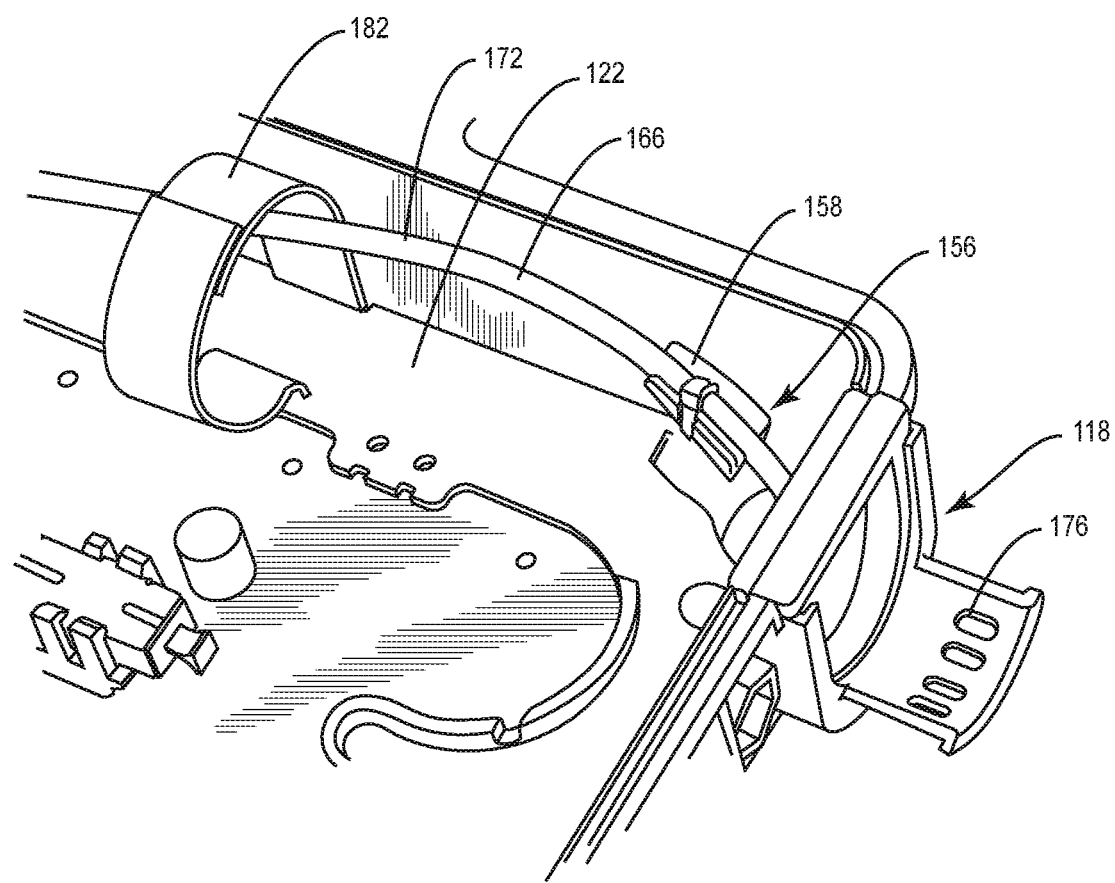
FIG. 9 depicts a close up view of a connection box at the entry of the customer-side fiber optic cabling from a sectional view perspective, according to an embodiment.

FIG. 9 depicts a close up view of the connection box 100 at the entry of the customer-side fiber optic cabling 166 and illustrates the advantageous bend limiting feature of the bend control 156. The bend radius of the length 172 of customer-side fiber optic cabling 166 is minimized by the bend control 156, as the bend-limiting surface 158 prevents the customer-side fiber optic cabling 166 from abruptly bending or pinching against an acute angle. In the embodiment in which the bend-limiting surface 158 is curved, the curvature angle may be aligned with the angle of entry of the length 172 of customer-side fiber optic cabling 166. Thus, the length 172 of customer-side fiber optic cabling 166 enters the connection box 100 at a gradual arc with minimal acute bending.

Advantageously, the bend control 156 reduces the leverage that customer-side fiber optic cabling 166 external to the connection box 100 has over the customer-side fiber optic cabling 166 that is within the connection box 100. Under substantial pulling of the customer-side fiber optic cabling 166 from outside of the connection box 100, the bend control 156 absorbs some or all of this pulling force and therefore mitigates the possibility that this pulling force will propagate past the bend control 156 and will cause tension in the customer-side fiber optic cabling 166. Furthermore, the bend control 156 provides a pivot point that is devoid of abrupt angles and distributes pulling forces across the bend-limiting surface 158. The length 172 of customer-side fiber optic cabling 166 that feeds into the interior space 116 and is parallel to the depth direction (D) can be tightened flush against the bend-limiting surface 158.

Figure 10:
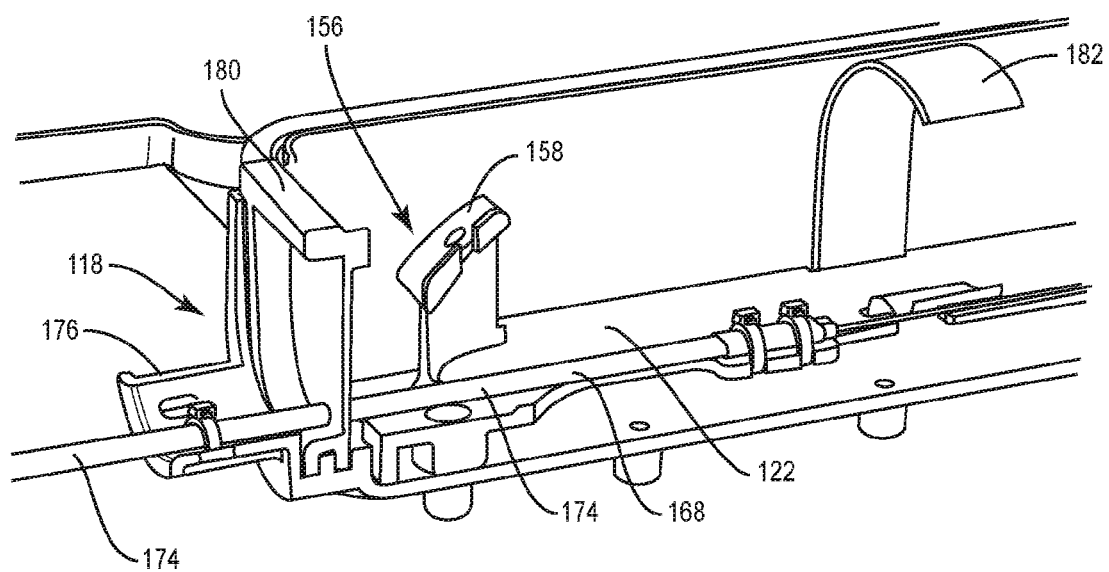
FIG. 10 depicts a close up view of a connection box at the entry of the service-provider side fiber optic cabling, according to an embodiment.

Referring to FIG. 10, a close up view of the connection box 100 at the entry of the service-provider-side fiber optic cabling 168 ports is depicted. The connection box 100 includes receiving surfaces 176 partially surrounding the cable ports 118 outside of the interior space 116 and extending away from one of the outer sidewalls 104. The receiving surfaces 176 are dimensioned to receive a conduit (shown in FIG. 8), so that the service-provider-side fiber optic cabling 168 can be protected from the exterior environment. According to an embodiment, the cabling bridge 120 is configured such that the planar platform section 122 adjoins the cable ports 118 on an opposite side as the receiving surface 176. Further, the cabling bridge 120 can be configured such that the planar platform section 122 is aligned with the receiving surfaces 176 in the depth direction (D). This allows the service-provider-side fiber optic cabling 168 to be routed though one of the cable ports 118 and lie flat on both the receiving surface 176 and the planar platform section 122 adjoining the cable ports 118. The first length 174 of customer-side fiber optic cabling 166 can be affixed to the receiving surface 176 and to the planar platform section 122, e.g., using zip-ties. Thus, the configuration of the cabling bridge 120 and receiving surface 176 advantageously allows for a secure connection between the service-provider-side fiber optic cabling 168 and connection box 100 with the first length 174 of customer-side fiber optic cabling 166 remaining flat throughout the entry into the connection box 100.

Complimentary shaped rubber or plastic grommets 180 may be used in conjunction with the entry ports 118. The service-provider-side fiber optic cabling 168 may be fed through a perforation in these grommets 180 such that the interior space 116 remains effectively enclosed.

Figure 11:
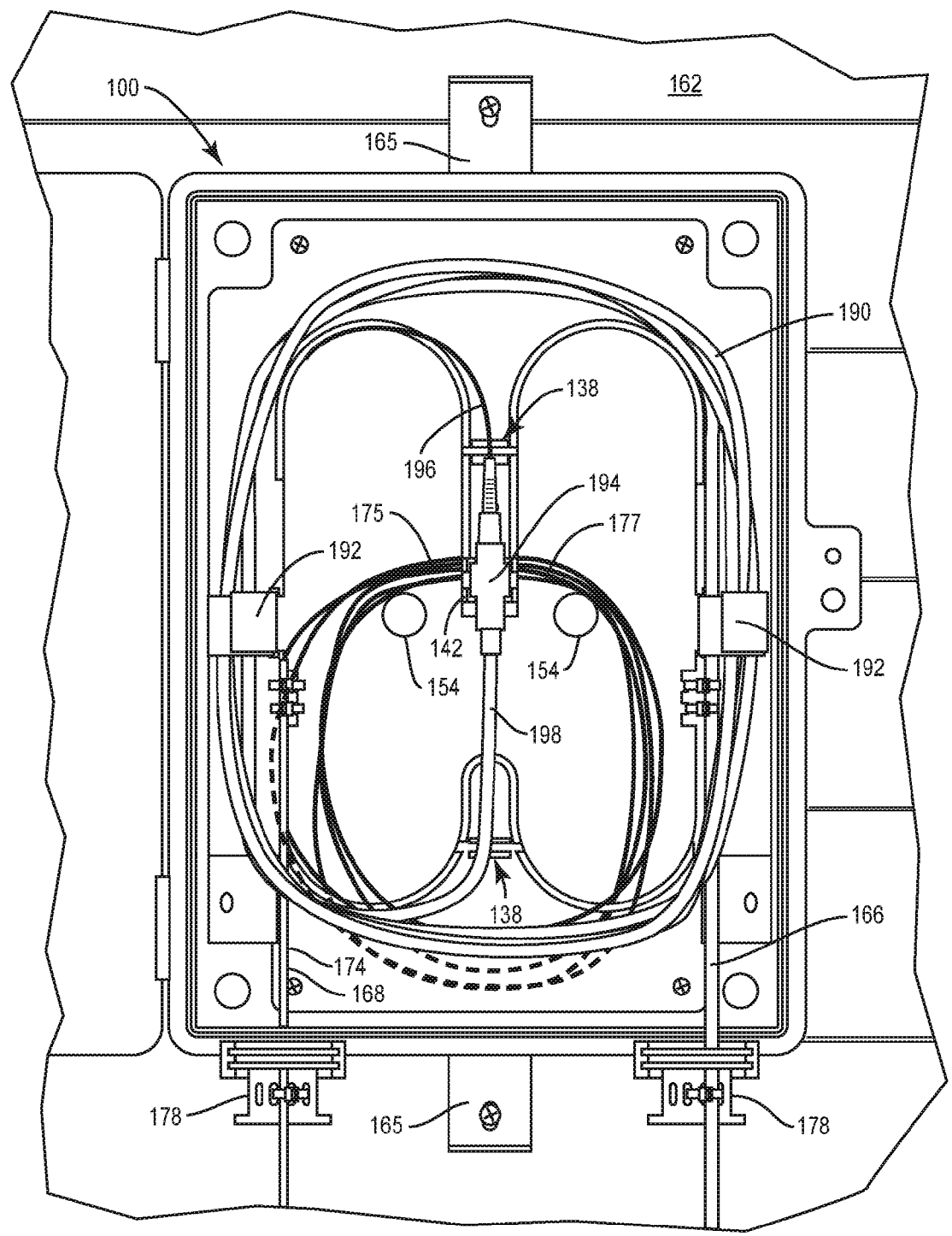
FIG. 11 depicts a connection box with a connection between customer-side fiber optic cabling with service-provider-side fiber optic cabling secured and stored within the connection box, according to another embodiment.

FIG. 11 depicts a fiber optic connection using the connection box 100. The configuration of FIG. 11 may be substantially similar or identical to the configuration of FIG. 8, with the exception of the configuration of the service-provider-side fiber optic cabling 168, which will be discussed below.

In the embodiment of FIG. 11, the service-provider-side fiber optic cabling 168 is configured as so-called "flat drop" cable with a diameter of the jacketed portion being 5 mm. In this configuration, there is no splice stored within the connection box 100. This first length 174 is fed into the connection box 100 and through the entry port 118 in a similar manner described above. The first length 174 of the service-provider-side fiber optic cabling 168 is jacketed. A second length 175 of the service-provider-side fiber optic cabling 168 is exposed from the cable jacket. The second length 175 of the service-provider-side fiber optic cabling 168 may be 900 µm cabling with a standardized connector (e.g., an SC connector) terminating the service-provider-side fiber optic cabling 168.

The second length 175 feeds from the first length 174 into the first interior volume 124. As shown in the embodiment of FIG. 11, the second length 175 of the service-provider-side fiber optic cabling 168 that is arranged in the first interior volume 124 has been coiled into a first coiled section 177 such that the first coiled section 177 is retained between the planar back section 102 and the cabling bridge 120. That is, the first coiled section 177 is stored within the termination box in a similar manner as the first coiled section 177 described with reference to FIG. 8.

In the embodiment of FIG. 11, the customer-side fiber optic cabling 166 has been coiled into a third coiled section 190 in a substantially similar or identical manner as discussed with reference to FIG. 8. Instead of forming the cable entry opening 170, an installer may optionally feed the customer-side fiber optic cabling through a second one of the entry ports 118. The end connector of the second length 175 of the customer-side fiber optic cabling 166 is mated with the end connector of the service-provider-side fiber optic cabling 168 using a standardized adapter 194. This completes the fiber optic connection between the service-provider and customer networks. This adapter 194 is securely affixed the adapter-receptacle 142.

The configuration of FIG. 11 utilizes the advantageous features of the connection box 100 in a similar manner as described above. For example, the planar platform section 122 is interposed between the first coiled section 177 and the third coiled section 190 and therefore provides a protective barrier preventing the two kinds of cabling from chafing with one another. Likewise, the protective collar 144 prevents the third coiled section 190 of the customer-side fiber optic cabling 166 from contacting and potentially damaging the more brittle second length 175 of the service-provider-side fiber optic cabling 168 that feeds into the adapter 194.

Spatially relative terms such as "under," "below," "lower," "over," "upper" and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having," "containing," "including," "comprising" and the like are open-ended terms that indicate the presence of stated elements or features, but do not preclude additional elements or features. The articles "a," "an" and "the" are intended to include the plural as well as the singular, unless the context clearly indicates otherwise.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A cabling bridge for securing and organizing fiber optic cabling within a fiber optic termination box, the cabling bridge comprising:
a planar platform section that is sized to be placed within a rectangular fiber optic termination box;
an opening centrally located in the planar platform section;
separation features extending away from a bottom-side of the planar platform section, the separation features being configured to separate the planar platform section from a planar back section of the fiber optic termination box; and
a pair of protrusions extending from the planar platform section into the opening and towards one another so as to at least partially divide the opening into first and second wider regions, with a narrower region of the opening being arranged between the pair of protrusions,
wherein the opening's perimeter comprises semi-circular boundaries transitioning between the protrusions and edge sides of the planar platform section that are opposite from the protrusions.

2. The cabling bridge of claim 1, further comprising:
a pair of splice holders extending away from a top-side of the planar platform section in an opposite direction as the separation features, wherein each of the splice holders comprise a splice receptacle being configured to secure a splice between two fiber optic cables,
wherein each splice holder is arranged on one of the protrusions such that the first and second wider regions of the opening are laterally adjacent to each splice receptacle.

3. The cabling bridge of claim 2, further comprising:
a protective collar arranged along a portion of the opening's perimeter,
wherein the protective collar extends from the planar platform section in an opposite direction as the separation features and past the splice receptacles such that the splice receptacle is spaced closer to the planar platform section than a top edge of the protective collar.

4. The cabling bridge of claim 3, wherein the protective collar is arranged along a portion of the opening's perimeter that includes a boundary between the protrusions and the opening, and wherein the protective collar comprises notches that are adjacent to and laterally aligned with each splice receptacle.

5. The cabling bridge of claim 1, wherein the cabling bridge further comprises an adapter receptacle arranged at an end of one of the protrusions, the adapter receptacle being configured to insertably receive a standardized fiber optic cabling adapter.

6. The cabling bridge of claim 1, wherein the cabling bridge further comprises a bend control extending away from the planar platform section in an opposite direction as the separation features, the bend control being configured to limit a bend radius of a section of the optic cabling that is pivoted around an outward facing bend-limiting surface of the bend control.

7. The cabling bridge of claim 6, wherein the outward facing bend-limiting surface is a curved surface that is spaced apart from the planar platform section and is inclined relative to the planar platform section.

8. The cabling bridge of claim 1, wherein the separation features comprise at least one of: a plurality of cylindrically shaped posts; and lower sidewalls at least partially lining an outer perimeter of the planar platform section.

9. A cabling bridge for securing and organizing fiber optic cabling within a fiber optic termination box, the cabling bridge comprising:
a planar platform section that is sized to be placed within a fiber optic termination box;
an opening centrally located in the planar platform section;
separation features extending away from a bottom-side of the planar platform section, the separation features being configured to separate the planar platform section from a planar back section of the fiber optic termination box; and
a bend control extending away from the planar platform section in an opposite direction as the separation features, the bend control being configured to limit a bend radius of a section of the optic cabling that is pivoted around an outward facing bend-limiting surface of the bend control.

10. The cabling bridge of claim 9, wherein the outward facing bend-limiting surface is a curved surface that is spaced apart from the planar platform section and is inclined relative to the planar platform section.

11. The cabling bridge of claim 9, further comprising:
a pair of protrusions extending from the planar platform section into the opening and towards one another so as to at least partially divide the opening into first and second wider regions, with a narrower region of the opening being arranged between the pair of protrusions.

12. The cabling bridge of claim 11, further comprising:
a pair of splice holders extending away from a top-side of the planar platform section in an opposite direction as the separation features, wherein each of the splice holders comprise a splice receptacle being configured to secure a splice between two fiber optic cables,
wherein each splice holder is arranged on one of the protrusions such that the first and second wider regions of the opening are laterally adjacent to each splice receptacle.

13. The cabling bridge of claim 12, further comprising:
a protective collar arranged along a portion of the opening's perimeter,
wherein the protective collar extends from the planar platform section in an opposite direction as the separation features and past the splice receptacles such that the splice receptacle is spaced closer to the planar platform section than a top edge of the protective collar.

14. The cabling bridge of claim 13, wherein the protective collar is arranged along a portion of the opening's perimeter that includes a boundary between the protrusions and the opening, and wherein the protective collar comprises notches that are adjacent to and laterally aligned with each splice receptacle.

15. The cabling bridge of claim 11, wherein the cabling bridge further comprises an adapter receptacle arranged at an end of one of the protrusions, the adapter receptacle being configured to insertably receive a standardized fiber optic cabling adapter.

16. A connection box for securing and storing a connection between service-provider-side fiber optic cabling and customer-side fiber optic cabling, the connection box comprising:
a planar back section;
outer sidewalk adjoining the planar back section and comprising front edges being spaced apart from the back section in a depth direction of the connection box, the depth direction being perpendicular to the back section;

a front door that is configured to be fixedly attached to the connection box at the front edges of the outer sidewalls so as to enclose an interior space of the connection box, the interior space being defined by the back section, the outer sidewalls and the front door;

a cabling bridge arranged within the interior space, the cabling bridge comprising:

a planar platform section having an outer perimeter that is dimensioned to be placed within the connection box;

an opening in the platform section providing a conduit in the depth direction between the first and second interior volumes; and a pair of protrusions extending from the planar platform section into the opening and towards one another so as to at least partially divide the opening into first and second wider regions, with a narrower region of the opening being arranged between the pair of protrusions.

17. The connection box of claim 16, wherein the opening's perimeter comprises semi-circular boundaries transitioning between the protrusions and edge sides of the planar platform section that are opposite from the protrusions.

18. The connection box of claim 16, wherein the cabling bridge further comprises:

a pair of splice holders extending away from a top-side of the planar platform section and towards the front edges in the depth direction, each of the splice holders comprising a splice receptacle being configured to secure a splice between the customer-side fiber optic cabling and the service-provider-side fiber optic cabling, wherein each splice holder is arranged on one of the protrusions such that the first and second wider regions of the opening are laterally adjacent to each splice receptacle.

19. The connection box of claim 16, wherein the cabling bridge further comprises:

a bend control extending away from the planar platform section and towards the front edges in the depth direction, the bend control being configured to limit a bend radius of a section of the customer-side fiber optic cabling that feeds into the interior space through an opening in the back section.

20. The connection box of claim 19, wherein the bend control comprises a curved surface that is spaced apart from the planar platform section in the depth direction and is inclined relative to the planar platform section.

* * * * *